United States Patent [19]

Troyer

[11] 4,046,230
[45] Sept. 6, 1977

[54] TUNED TORSIONAL VISCOUS DAMPERS

[75] Inventor: William J. Troyer, Orchard Park, N.Y.

[73] Assignee: Houdaille Industries, Inc., Buffalo, N.Y.

[21] Appl. No.: 705,158

[22] Filed: July 14, 1976

[51] Int. Cl.² .............................................. F16F 15/12
[52] U.S. Cl. ..................................... 188/1 B; 74/574
[58] Field of Search .......................... 74/574; 188/1 B

[56] References Cited

U.S. PATENT DOCUMENTS

| | | | |
|---|---|---|---|
| 3,174,360 | 3/1965 | Katzenberger | 74/574 |
| 3,373,633 | 3/1968 | Desmond et al. | 74/574 |
| 3,410,369 | 12/1968 | Ishizuka | 188/1 B |
| 3,462,136 | 8/1969 | Rumsey | 188/1 B UX |
| 3,678,782 | 7/1972 | Aoki | 74/574 |

*Primary Examiner*—Duane A. Reger

*Attorney, Agent, or Firm*—Hill, Gross, Simpson, Van Santen, Steadman, Chiara & Simpson

[57] ABSTRACT

Elastic tuning, spacing and sealing rings substantially fill annular grooves in a ring shaped inertia mass and face toward and into engagement with the body of supporting disk means extending radially into an annular working chamber defined by the inertia mass, the chamber being substantially filled with a viscous damping medium. Annular retaining flanges along the radially inner sides of the grooves assist in mounting the elastic rings in concentric relation to one another and to the working chamber and protect the rings against intrusion of dirt and contaminants. The grooves are partially unfilled and provide damping medium reservoirs about the radially outer sides of the elastic rings.

Several optional configurations and combinations are disclosed to meet practical considerations.

28 Claims, 20 Drawing Figures

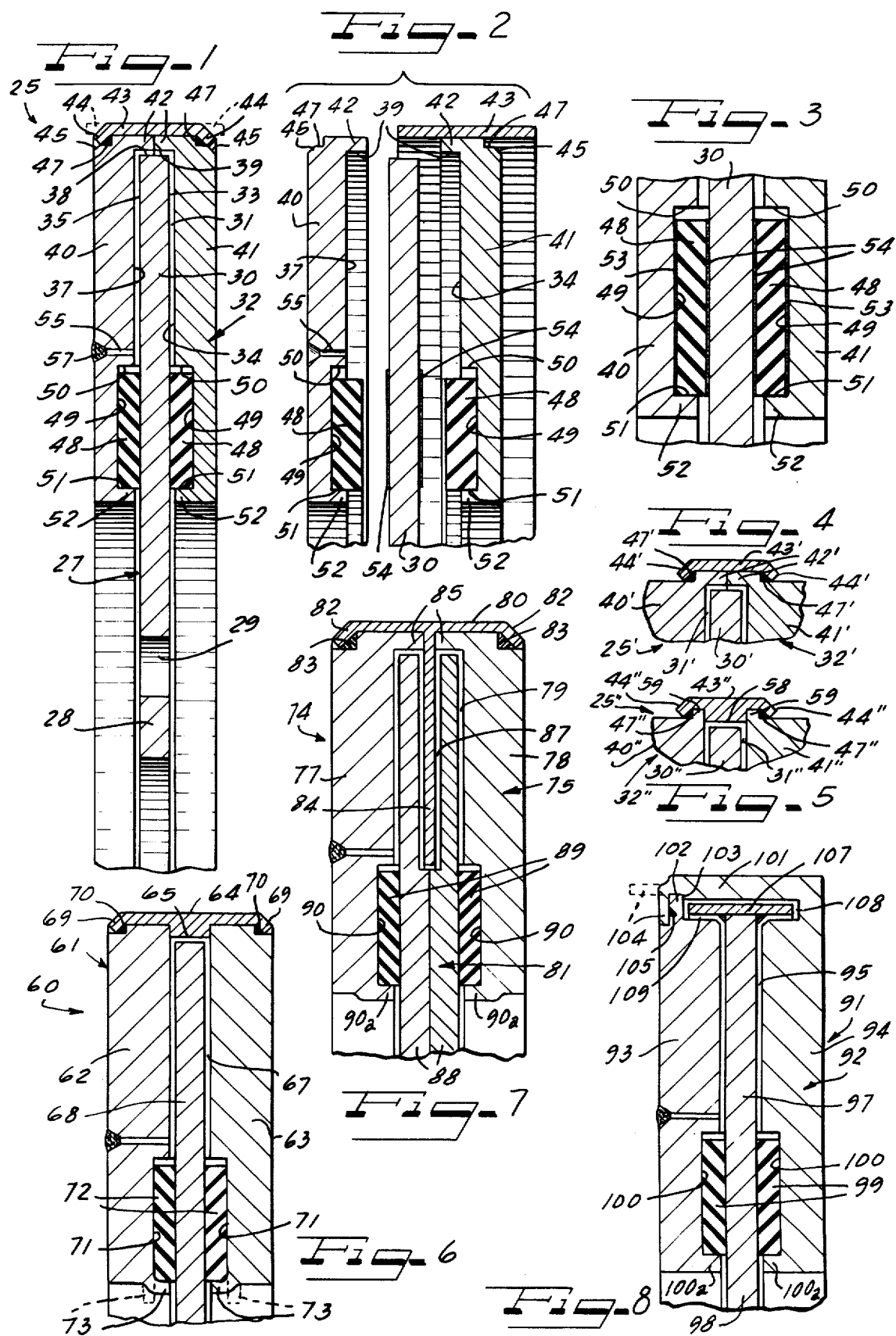

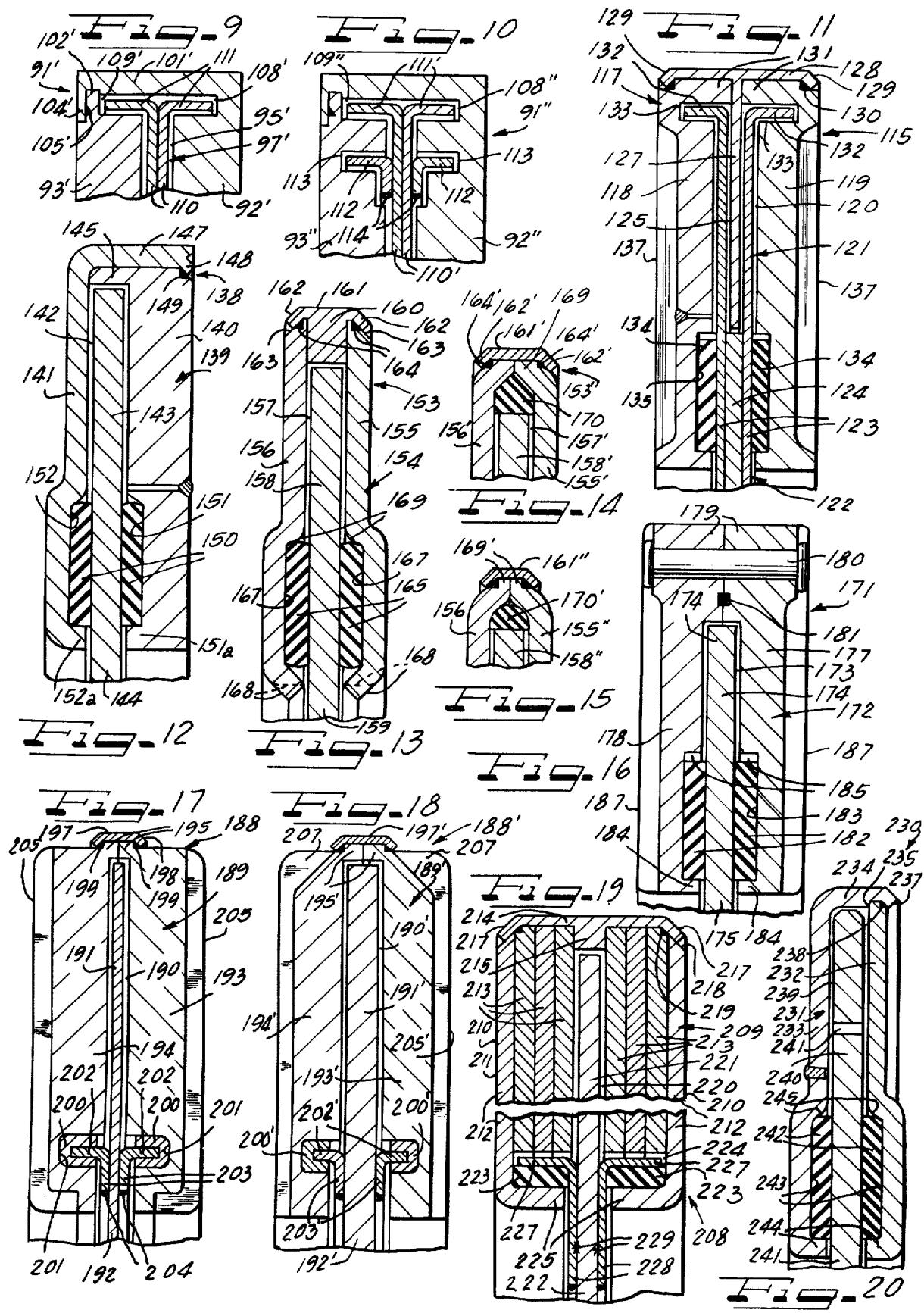

TUNED TORSIONAL VISCOUS DAMPERS

This invention relates generally to improvements in viscous torsional vibration dampers, and is more particularly concerned with dampers of this type in which an inertia ring is mounted on a radially extending combination supporting damper disk flange plate and mounting hub.

As is well known in the art, numerous advantages have been experienced with viscous torsional vibration dampers, that is dampers utilizing the phenomenon of resistance to shearing of a thin layer of viscous damping medium such as silicone fluid between relatively moving opposed parallel working surfaces in part corotative with a rotary member such as a crank shaft subject to torsional vibrations and in part carried by an inertia mass relatively torsionally movable with respect to the rotary member to be damped. One desirable form of such dampers comprises a disk-like flange structure having a hub portion to be attached to the rotary member to be damped and a radially extending body portion carrying a ring shaped inertia member having a working chamber enclosing an annular body portion, with surfaces of the disk body and the inertia member in shear film spaced relation having regard to the viscosity of the viscous damping medium sealed within the chamber by means of elastic sealing rings at the radially inner side of the working chamber. In a desirable arrangement, the elastic rings have a combined sealing and spacing function.

According to several prior arrangements, of which U.S. Pat. No. 3,303,719 is representative, the sealing and spacing rings are located at juncture of the inertia member carrying portion of the mounting disks and axially extending flanges on the disks between the carrying portion and the hub portion. Such an arrangement affords little, if any, tuning advantage from the elastic rings.

As is well disclosed in U.S. Pat. No. 2,636,399, for example, an objectionable torsional vibration may occur at some speed within the normal operating speed range for the mass elastic system being damped; and to overcome this it is desirable to connect the damper inertia mass to the hub by means of rubber or rubber-like tuning spring means in such a fashion that the frequency of the spring and inertia mass is a certain percentage of the natural frequency of the entire mass elastic system, thereby providing a counteracting force which gives the damper hub and inertia mass significantly more relative movement than they would have without the tuning spring. Since the amount of friction work that can be done by the viscous damping elements and by the elastic tuning spring means is a function of the relative amplitude, dampers using the tuning spring means are capable of transforming more torsional vibratory energy into heat energy and are thus capable of reducing the torsional vibration amplitudes of the system to lower levels. This desirable effect is contingent upon being able to obtain the proper dimensions and location of the elastic spring means. In the forms of the damper shown in U.S. Pat. No. 2,636,399, the elastic tuning rings are enclosed within the working chamber in which the inertia mass is housed.

A damper arrangement of the inertia ring carried on a mounting disk type which can attain at least some tuning advantage from the greater resistance to shear of elastic bodies as compared to viscous damping medium alone is disclosed in U.S. Pat. No. 3,410,369. However, serious deficiencies in that disclosure are the difficulty in attaining concentricity of the elastic rings, and exposure of the rings to dirt and contaminants. In the examples disclosed in U.S. Pat. No. 3,410,369, the radially inner sides of the elastic rings are uncontrolled so that during assembly of the dampers the rings are liable to eccentric misplacement. There is complete exposure of the radially inner sides of the tuning rings to dirt and contaminants.

It is, therefore, an important object of the present invention to overcome the disadvantages, deficiencies, inefficiencies, shortcomings and problems presented by prior constructions, and to provide new and improved tuned viscous damper constructions which will efficiently meet tuning requirements in a basically torsional viscous damper of the kind having the inertia mass supported on mounting disk means.

Another object of the invention is to provide a new and improved tuned torsional viscous damper in which the structural relationships are such as to assure efficient tuning.

A further object of the invention is to provide a new and improved means for assuring substantially accurate, efficient, balanced tuning by means of elastic, i.e., rubber including elastomeric, tuning spring rings in torsional viscous dampers.

Still another object of the invention is to provide new and improved structural relationships in torsional viscous vibration dampers of the kind in which an inertia ring is supported on a combined damper disk and attaching hub member.

According to the features of the invention, a tuned torsional viscous damper is provided having supporting disk means with a radially extending circular body and a radialy inner hub portion adapted to be secured to a rotary member such as a crankshaft subject to vibrations to be damped, a ring shaped inertia mass having a radially inwardly opening annular working chamber in which the body of the disk is received, a viscous damping medium in the chamber, the body and the inertia mass having parallel confronting working surfaces in shear film spaced relation having regard to the viscosity of the damping medium, the inertia mass having coaxial annular grooves facing axially toward the body adjacent to the radially inward chamber opening; elastic tuning, spacing and sealing rings engaging the inertia mass in the grooves and engaging with surfaces on the disk body; and generally axially extending retaining flange means at the radially inner sides of the grooves assuring concentricity and protective enclosure of the elastic rings. A new and improved method of making the damper is provided.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

FIG. 1 is a vertical longitudinal sectional detail view showing a representative construction in a preferred embodiment of the invention;

FIG. 2 is an exploded assembly view of the embodiment of FIG. 1;

FIG. 3 is an enlarged fragmentary detail view of the tuning spring ring area of the embodiment of FIG. 1; and FIGS. 4 to 20, inclusive, respectively show various modifications in the damper of the present invention.

In the tuned rubber viscous torsional vibration damper 25, as shown in FIG. 1, a supporting disk member 27 may comprise a flat annular disk of suitable thickness having a radially inner hub portion 28 provided with means such as bolt holes 29 to facilitate mounting of the disks in concentric corotational relation on a rotary structure such as a crankshaft. Extending integrally radially outwardly relative to the hub portion 28 of the disk 27 is a circular body portion 30 which is received within a radially inwardly opening annular working chamber 31 defined within a ring shaped inertia mass 32. Within the working chamber 31, the body portion 30 has an axially facing working surface 33 in spaced parallel relation to a working surface 34 of the inertia mass, and an oppositely axially facing working surface 35 of the body is in spaced parallel relation to a confronting axially facing working surface 37 of the inertia mass. At its perimeter, the body 30 may have an annular radially outwardly facing working surface 38 in parallel relation to an annular radially inwardly facing working surface 39. The spacing between the various confronting working surfaces is predetermined in respect to the viscosity of a viscous damping medium substantially filling the chamber 31 to result in shear films of the medium between the parallel confronting working surfaces, having regard to the viscosity of the damping medium. Thereby relative parallel movement between the body 30 and the inertia mass 32 is resisted by the viscous damping medium acting as a viscous coupling and any relative parallel torsional movement causes laminar shearing of the viscous medium whereby energy is dissipated and vibrations are damped. The damping medium may comprise a silicone fluid of suitable viscosity for the intended purpose.

In a desirable construction, the inertia mass 32 comprises a pair of substantially equal opposite complementary inertia ring members 40 and 41 having at their radially outer perimeters spacer flanges 42 which extend into edge-to-edge abutment and substantially accurately define the spacing between the working surfaces 34 and 37 of the inertia mass. For securing the inertia ring members 40 and 41 fixedly concentric, means comprising a securing ring 43 extends about the outer perimeters of the joined inertia rings, and the opposite margins of the ring 43 are bent as by spinning or cramping from the original diameter shown in dash outline in FIG. 1 into locking flanges 44 onto chamfered shoulder surfaces 45 on the respective inertia rings, with suitable sealing means locked by the flanges 44 into grooves 47 in the surfaces 45. This hermetically seals the radially outer perimeter of the working chamber 31 defined within the inertia mass 32.

At its radially inner perimeter, the working chamber 31 is sealed by combination elastic tubing, spacing and sealing rings 48. To provide adequate mass in the rings 48 for tuning purposes they are of substantial radial extent and axial thickness and durometer for their intended tuning function. To accommodate the rings 48, each of the inertia members 40 and 41 is provided with a groove 49 at the radially inner end of the respective working surfaces 34 and 37. As will be noted, the grooves 49 are of equal depth and width and as nearly as practicable perfectly concentric. At their radially outer limits, the grooves 49 are defined by respective axially extending shoulder wall surfaces 50 defining with the radially outer sides of the rings 48 viscous damping medium reservoir spaces communicating with the chamber 31. At their radially inner sides, the grooves 49 are defined by radially outwardly facing respective shoulder wall surfaces 51 provided by solid respective axially extending ring retaining and protective flanges 52 concentrically on the inertia ring members. By having the axially extending shoulders 51 axially aligned, and the tuning rings 48 of substantially the same inside diameter as these shoulders there is assured concentricity and optimum cooperative tuning function of both of the tuning rings. It may be observed that in implementation of their tuning and sealing spring function, the elastic rings 48 are desirably on the order of five or six times as wide as their thickness. To attain their spacing function, the elastic rings 48 are of sufficiently equal greater thickness than the depth of the grooves 49 so that the elastic rings project from the grooves across the shear film spacing gaps between the axially facing working surfaces on the body 30 and the inertia rings 40 and 41, thereby maintaining substantially accurate shear film spaced relation between the axial working surfaces. Desirable protection is provided by the sealing engagement of the radially inner diameters of the elastic rings 48 with the radially outwardly facing sealing shoulder wall surfaces 51 against contaminants and dirt reaching and deteriorating or interfering with proper functioning of the spring rings 48.

By bonding of the rings to the root surfaces within the grooves 49 as well as to substantially equal areas of the body 30, the elastic rings 48 effect thorough hermetic sealing of the working chamber 31. Such bonding may be frictional by compressive pressure against the elastic rings 48 clamped and squeezed to a thinner, wider section between the inertia rings 40 and 41 and the body 30; or the bonding may be effected by means of suitable bonding or adhesive agent with or without compressive clamping pressure upon the elastomeric rings to attain a desired tuning value. In any event, the elastic rings 48 are maintained in thoroughly concentric, stabilized tuning relation to the body 30 and the inertia mass 32. As used herein, the term "elastic" means a rubber or rubber-like elastomeric material possessing the proper elasticity for the tuning function of the rings 48. At least on those surfaces exposed to the viscous damping medium fluid, the rings 48 must be inert to such fluid.

In assembling the parts of the damper 25, as demonstrated in FIG. 2, the preformed elastic rings 48 are mounted within the grooves 49 about the shoulders 51 serving as alignment pilot means, and in an uncompressed condition wherein they are preferably sufficiently thicker than the depths of the grooves 49, so that when the rings are placed under compression between the inertia disks 40 and 41, they will uniformly expand in the grooves toward their radially outer sides but without filling the reservoir spaces. In the uncompressed condition, the rings 48 are of substantially differently smaller diameter at their radially outer sides than the diameter of the groove shoulders 50, and are substantially the same diameter at their radially inner sides as the shoulders 51 of the grooves. Thereby, the radially inner shoulders 51 provide satisfactory gauging or pilot surfaces to assure substantial concentricity of the respective elastic rings 48 in the grooves facilitating economical assembly of the damper.

Bonding of the elastic rings 48 in the assembly may be simply functional, but a suitable bonding agent 53 (FIG. 3) may secure them to the root surfaces in the respective grooves 49, and the areas of the body 30 to be engaged by the elastic rings 48 may be coated with a suitable bonding agent 54. When the rings 48 are pressed against the body 30, a thoroughly bonded relationship will be assured. By bonding the rings 48 at their axially facing surfaces to the damper components, but leaving the radially facing edges of the rings 48 free with respect to the surfaces of shoulders 50 and unbonded relative to the surfaces of the shoulders 51 excellent tuned torsional damping is attained by means of the elastic spring tuning rings without detrimental distortions at the radial perimeters of the tuning rings. Bonding of the axial surfaces of the rings 48 also assures thorough hermetic sealing of the working chamber 31.

Assembly of the mechanical components of the damper is completed by squeezing the inertia disks 40 and 41 together to place the elastic rings 48 under compression and causing the radially outer spacer flanges 42 to abut, sliding the securing ring 43 into position about the perimeter of the inertia ring assembly, and bending the marginal retaining flanges 44 as by spinning into locking retaining position as shown in FIG. 1. The final step in completing the damper comprises filling the working chamber 31 with viscous damping medium as by introducing the same through a filling opening 55 which after filling is sealed by means of a plug 57. It will be understood that one or more additional openings or ports similar to the filling opening 55 may be provided for evacuation of air from within the chamber 31 in the course of filling the damper.

In FIG. 4 a modification in the outer perimeter of the damper 25' is shown while the remainder of the damper may be substantially the same as the damper 25 of FIG. 1, the body 30' of the mounting disk plate being received in the working chamber 31' defined within the inertia mass ring 32' comprising the annular complementary inertia members 40' and 41' having the working chamber closure and spacer flanges 42'. In this instance, the retainer and sealing ring 43' is substantially narrower than the similar ring 43 of FIG. 1, and the sealer-filled grooves 47' and the marginal sealing margins 44' are located symmetrically adjacent to the flanges 42'.

In FIG. 5, the damper 25" is similar to the damper 25', but the inertia members 40" and 41" of the inertia ring 32" do not have peripheral spacer and closure flanges about the perimeter of the working chamber 31" within which the mounting plate disk plate body 30" is received. In this instance the retainer and sealing ring 43" has an annular spacer and closure rib 58 which extends radially inwardly between radially outwardly projecting annular engagement ribs 59 on the perimeters of the inertia members 40" and 41". The marginal generally radially inwardly turned securing flanges 44" of the ring 43" lock the flanges 59 against the axial sides of the rib 58 and close sealing material filled grooves 47".

As shown in FIG. 6, the damper 60 is much the same as the damper 25 of FIG. 1 except that the damper 60 has an inertia ring 61 of greater mass, its annular complementary component inertia members 62 and 63 are thicker and thus of greater mass than the inertia members 40 and 41 in FIG. 1. In addition, the damper 60 has a perimeter securing ring 64 which has, similarly as the corresponding ring in FIG. 5 an annular radially inwardly extending closure and spacer rib 65 for maintaining the members 62 and 63 accurately spaced to provide shear film working chamber space 67 within which cylinder damper plate body 68 is received, with the opposed, confronting working surfaces of the members 62 and 63 and the rib 65 and the mounting, supporting disk body 68 being in shear film spaced relation having regard to the viscosity of viscous damping medium substantially filling the working chamber 67. At its opposite margins, the ring 64 has turned locking flanges 69 securing sealing means in respective grooves 70 in the securing shoulder portions of the members 62 and 63. Adjacent their radially inner edges, the inertia members 62 and 63 have in their inner faces respective coaxially aligned substantially equal width grooves substantially the same as the grooves 49 in FIG. 1 and in which tuning, spacing and sealing elastic rings 72 are seated in bonded relation to the members 62 and 63 and the engaged areas of the disk body 68. At their radially inner sides, the grooves 71 are defined by elastic ring concentricity assuring and protective means similarly as in FIG. 1, in this instance comprising respective axially extending flanges 73 which may be originally radially inwardly extending as shown in dash outline and at a suitable point in fabrication of the damper turned into the axial orientation as shown in full outline. This may facilitate manufacturing the inertia members 62 and 63 by processes which would be complicated if the grooves 71 were to be delineated at their radially inner sides by the flanges 73 already axially oriented.

In the modification shown in FIG. 7, means are provided for substantially increasing the viscous damping capability of the damper 74. To this end inertia ring 75 which is constructed of complementary inertia members 77 and 78 has a working chamber 79 of greater width than the similar chamber in FIGS. 1 and 6. A peripheral securing ring 80 not only provides a sealing rim about the inertia mass 75, but also has means for increasing the working surfaces of the inertia mass with respect to a radially extending circular body 81 of supporting disk means extending into the working chamber 79. For this purpose, the rim ring 80 has not only turned marginal locking flanges 82 engaging retaining shoulders of the members 77 and 78 and securing sealing material in grooves 83, but also has an annular radially inwardly projecting central working surface flange 84 extending into the working chamber 79 between axial spacer and closure flanges 85 at the perimeter of the members 77 and 78. For shear film damping coaction with the disk body 81, the flange 84 extends into an annular radially outwardly opening groove 87 in the disk body 81 serving as an extension of the working chamber 79 and within which the confronting surfaces of the disk body and the flange 84 are in parallel shear film gap relation having regard to the viscosity of viscous damping medium in the chamber 79 and the extension groove 87, similarly as the confronting shear film spaced parallel working surfaces of the members 77 and 78 and the disk 81 in the working chamber 79. In a preferred construction the damper disk comprises a pair of complementary coaxially joined disk plates 88 having their joined surfaces secured and hermetically sealed as by means of an O-ring, an epoxy bonding agent, or the like. Each of the plates 88 is recessed to provide one-half of the groove 87 accurately dimensioned to provide the proper shear film space gap relationship between the confronting surfaces of the disks 88 and the flange 84. Similarly, as in the previously described forms of the invention, the damper 74 has combination elastic tuning spring, spacing and sealing rings 89 bonded to the inertia members 77 and 78 within respective grooves 90 and bonded to the confronting surfaces of the plates 88, the grooves 90 being provided at their radially inner sides with flange means 90a assuring concentricity and protection of the rings.

In another form of the damper identified at 91 in FIG. 8, an annular inertia mass 92 comprises an inertia member 93 complementary to and joined with an inertia member 94 defining therebetween a viscous damping medium working chamber 95 into which extends a circular body 97 of a supporting damper plate disk 98, a shear film spaced relation between the damper members and the disk body being maintained by elastic tuning spring, spacing and sealing rings 99 bonded in grooves 100 and to the engaged areas of the disk body 97, the grooves having flange means 100a at their radially inner sides assuring concentricity and protection of the rings. In this instance, the inertia members 93 and 94 are connected together at their perimeter by means of a lateral annular flange 101 on the inertia member 94 and interengage with a radially extending rib flange 102 on the member 93 which fits against an annular gauging shoulder 103 to maintain accurately spaced relation of the inertia members 92 and 93. Means such as an integral annular locking flange 104 provided as an extension from the flange 101 secures the inertia members together, being bent, as shown, from the dash line position to the full line position for this purpose. A hermetic seal is formed by sealing means locked in a seal groove 105 by the securing flange 104. In order to increase the torsional vibration damping efficiency of the damper 91, a lateral flange 107 on the radially outer edge of the disk body 97 extends into a working chamber groove extension 108 provided in the inertia member 92, and in a similar working chamber groove extension 109 defined by and between the inertia member 93 and the flange 101. All confronting surfaces of the annular ring 107 and the inertia members in the grooves 108 and 109 are in shear film spaced relation similarly as the confronting surfaces of the inertia members and the disk body 97, the elastic rings 99 facilitating maintaining such shear film spaced relationships throughout the damper.

FIG. 9 depicts a damper 91' which is a modification of the damper 91 in that the supporting damper disk body 97' comprises a pair of thinner complementary disk members 110 which may be formed up from sheet metal and suitably secured in back-to-back relation with lateral flanges 111 thereon aligned in coaxial relation and extending into the working chamber groove extensions 108' and 109' provided in and by the inertia members 92' and 93'. Other parts corresponding to the damper 91 are identified by primed reference numerals.

In a further modification, as shown in FIG. 10, the damper 91" is substantially the same as the damper 91' in FIG. 9, with further increase in damping efficiency by the addition of annular axially extending working surface flanges 112 extending into complementary axial grooves 113 in the inertia members 92" and 93" located in radially inwardly spaced relation to the viscous damping efficiency increasing axial flanges 111' and their working chamber branch grooves 108" and 109". Although the flanges 112 may, if preferred, be integrally struck out from the disk body plates 110', they may, as shown, be formed as separate pieces and secured as by means of welding 114 to the plates 110'. In other respects, the damper 91" is substantially the same as the damper 91' of FIG. 9.

FIG. 11 illustrates a modified damper 115 which embodies features of the dampers shown in FIGS. 7, 8 and 9 and including an inertia ring 117 comprising annular inertia members 118 and 119 defining therebetween a radially inwardly opening viscous damping fluid filled working chamber 120 within which is received a circular body 121 of a supporting damper disk 122. In this instance, the disk 122 comprises a plurality of coaxial plates which may be stamped from sheet metal, comprising similar axially outer plates 123 with a spacer plate 124 therebetween and which is of substantially smaller diameter whereby the radially outer portions of the plates 123 define therebetween a working chamber extension groove 125 into which a viscous damping enhancing annular radially inwardly extending flange 127 extends from an outer perimeter retaining and sealing ring 128 which has turned marginal flanges 129 locking sealing material in grooves 130 and firmly retaining axial perimeter flanges 131 of the inertia members 118 and 119 in gripping centering engagement with the flange 127. Lateral axial extending annular working surface extension flanges 132 on the outer perimeters of the plates 123 extend into complementary working chamber extension grooves 133 in the inertia members 118 and 119. Concentric elastomeric combination tuning spring, spacing and sealing rings 134 are maintained in concentric alignment in respective grooves 135 in the members 118 and 119 adjacent their inner perimeters and similarly as in the previously described forms of the invention are bonded to the confronting axial surfaces of the damper and maintain the confronting working surfaces within the working chamber 120 and its extension grooves 133 in substantially accurate shear film spaced relation. Desirably, improved dissipation of heat resulting from vibration energy absorption in the damping function of the damper 115 is attained by increasing the external surfaces of the inertia members 118 and 119 by means of cooling fins 137.

In a damper 138 according to the invention, as shown in FIG. 12, a combination of cast or forged and stamped sheet metal inertia parts are assembled to provide a ring-shaped inertia mass 139, comprising a forged or cast annular inertia member 140 and a stamped heavy gauge sheet metal inertia member 141. Between them, the members 140 and 141 define a radially inwardly opening annular working chamber 142 within which is received a circular body portion 143 of a supporting plate disk 144. A spaced relation of the members 140 and 141 to provide the working chamber 142 is maintained by means of an annular axially extending perimeter flange 145 on the member 140 engaging the member 141 which maintains concentric assembled relation with the member 140 by means of an axially extending perimeter flange 147 which embraces the perimeter of the member 140 and is locked thereto by means of a locking flange 148 turned into sealing relation to sealing material in an annular groove 149 at the corner of the member 140 opposite the flange 145. Elastic tuning spring, spacing and sealing rings 150 are bonded in concentric relation to and between the members 140 and 141 and the body 143, being received in a recess groove 151 in the inner face of the inertia member 140 and in a corresponding coaxially aligned groove 152 formed in the member 141, and both of the grooves 151 and 152, being defined at their radially inner sides by flange means 151a and 152a respectively assuring balanced tuning concentricity of the rings 150.

A damper 153 as shown in FIG. 13 is functionally similar to the dampers already described, but comprises an inertia ring mass 154 formed from complementary annular inertia members 155 and 156 which are adapted to be formed up from suitable heavy gauge steel sheet or plate material as by stamping. Between them, the members 155 and 156 define a working chamber 157 into which extends a circular body portion 158 of a supporting damper disk 159. At their outer perimeters, the members 155 and 156 are maintained in accurately spaced relation by an annular radially inwardly projecting spacer rib 160 on a retaining and sealing ring 161 which has annular marginal flanges 162 turned into retaining engagement with oblique shoulders 163 on the members 155 and 156 and into sealing relation to respective grooves 164 containing a suitable sealing material. Substantially accurate shear film spaced relation of the confronting working surfaces of the members 155 and 156 and the body 158 as well as the spacer rib 160 within the working chamber 157 is maintained by elastic combination tuning spring, spacing and sealing rings 165 seated in respective grooves 167 provided in the radially inner portions of the members 155 and 156. The rings 165 are maintained in concentric alignment and protectively enclosed at their radially inner sides by means of an angularly turned inner marginal flanges 168. Angular shoulders 169 cooperate with the radially outer edges of the rings 165 to provide annular reservoir spaces. Although the flanges 168 may be turned to an oblique angle as shown in full outline, if preferred they may be turned to substantially right angular relation to the faces of the members 155 and 156 as shown in dash outline. It will be understood, of course, that the elastic rings 165 will be suitably bonded at their axial faces to the respective confronting axial surfaces of the associated damper components.

In FIG. 14, the damper 153' is substantially the same as the damper 153 of FIG. 13, but the inertia members 155' and 156' are maintained in proper spaced relation by means of abutting turned spacer flanges 169 at their outer perimeters engaged by the ring 161' which in this instance does not have a spacer rib, but has the marginal turned flanges 162' retainingly engaged with the outer sides of the turned flanges 169 and in sealing engagement with sealing material trapping grooves 164'. In addition to, or instead of, the sealing grooves 164' and the sealing material therein, a sealing ring 170 may be interposed between the flanges 169 and the perimeter of the damper body 158'. On the other hand, the ring 170 may be merely in the form of a bearing ring.

In FIG. 15 another slight modification is depicted wherein the inertia members 155" and 156" terminate at their outer perimeter in abutting spacer flanges 169' which taper to a smaller dimension than the corresponding flanges in FIG. 14, whereby the retaining and sealing ring 161" is narrower, although in other respects functionally similar to the corresponding ring 161' in FIG. 14. The sealing or bearing ring 170' conforms to the shape at the inner side of the flanges 169', but is similarly oriented relative to the damper disk body 158" as in respect to the corresponding arrangement in FIG. 14.

As shown in FIG. 16, a damper 171 comprises a ring shaped inertia mass 172 having a radially inwardly opening annular working chamber 173 within which a circular body 174 of a supporting disk 175 is received. In this instance, complementary annular inertia members 177 and 178 have abutment flange portions 179 of substantial radial dimension and secured in fixed abutment by means such as a suitable number of bolts or rivets 180. The joint between the axial flanges 179 is sealed as by means of a sealing ring 181. Elastic combination tuning spring, spacing and sealing rings 182 substantially fill grooves 183 provided for this purpose in the radially inner portions of the inner faces of the inertia members 177 and 178, being bonded to the confronting axially facing surfaces of the members 177 and 178 and the disk body 174. At their radially inner sides, the grooves 183 are provided with means comprising axially extending flanges 184 on the inner perimeters of the members 177 and 178 for assuring concentricity of and providing enclosing protection for the rings 182. Reservoir spaces 185 are provided about the radially outer sides of the rings 182 within the grooves 183 and communicating with the working chamber 173 within which the surfaces of the inertia members 177 and 178 and the disk body 174 are in shear film spaced relation having regard to the viscosity of the viscous damping medium in the chamber 173 and the reservoir spaces 185 communicating therewith. Heat dissipating ribs 187 may be provided on the outer surfaces of the inertia members 177 and 178.

Referring to FIG. 17, a tuned viscous damper 188 according to the invention comprises a massive ring shaped inertia mass 189 having a radially inwardly opening annular working chamber 190 which is of substantial radial dimension, but as narrow as practicable and into which extends a circular body portion 191 of a supporting damper disk 192. In this instance, the inertia mass 189 comprises complementary coaxially aligned ring shaped inertia members 193 and 194 which are provided with axially extending abutment flanges 195 at their radially outer perimeters closing the radially outer side of the working chamber 190 nd providing means whereby a retaining and sealing ring 197 is lockingly engaged through turned marginal flanges 198 with projecting portions of the flanges 195, and locking sealing means 199 in the joint for hermetically sealing the radially outer side of the working chamber 190. At its radially inner side, the working chamber 190 is sealed by elastic combination tuning spring, spacing and sealing rings 200 which, in this instance, are of generally U-shape cross-section substantially filling respective coaxially aligned grooves 201 in the radial inner portions of the inertia members 193 and 194 and attaining stress minimizing, large rubber volume in small space. Concentricity and protective enclosure of the rings 200 is assured by means at least at the radial inner sides of the grooves 201, although in the preferred arrangement, the elastic rings 200 are in engagement with all surfaces defining the grooves 201 and are bonded thereto at least frictionally. Engagement of the elastic rings 200 with surfaces on the disk body 191 is through respective axially opposite extending annular flanges 202 which project into and are preferably bonded at least frictionally to the elastic rings 200. Each of the flanges 202 may have a radially inwardly extending attachment flange 203 secured as by means of welding 204 to the adjacent side of the disk body 191. The interengagement of the flanges 202 with the elastic rings 200 maintains proper shear film spaced relation between the confronting parallel working surfaces of the inertia members 193 and 194 and the disk body 191 within the working chamber 190 and provides reservoir spaces between the rings and the radially inner sides of flanges 202. Heat dissipating fins 205 may be provided on the outer sides of the inertia members 193 and 194.

In FIG. 18, a tuned torsional viscous damper 188' is depicted which in general respects is the same in structure and function as the damper 188 in FIG. 17, except that in the damper 188', the circular body 191' of the disk 192' is substantially thicker. Also, the cooling fins 205' are extended onto the radially outer portions of the inertia members 193' and 194' of the inertia ring 189', the fin extensions being identified at 207. All other elements of the damper 188' are identified by primed reference numerals corresponding to the numerals in FIG. 17 and the same description applies.

In FIG. 19, a damper 208 embodying features of the invention is depicted which has a fairly massive ring shaped inertia mass 209 comprising complementary fairly massive inertia ring members 210 and 211 adapted to be fabricated from stamped heavy gauge sheet metal laminations, each comprising an outer lamination 212 and a plurality, herein three stacked coaxially aligned laminations 213. If preferred, all of the laminations may be secured together, although as will be observed, the construction and relationship is such that in the final assembly, they will all be held in face-to-face abutment with one another. At their radially outer perimeters, the inertia members 210 and 211 are secured together by generally axially extending retaining ring 214 having a central inwardly projecting annular spacer rib 215 against which the members 210 and 211 are locked by means of marginal turned annular locking flanges 217 on the ring 214, engaging against oblique cooperating shoulders 218 on the inertia members and locking sealing means in respective annular grooves 219. The spacer flange 215 maintains the innermost faces of the inertia members 210 and 211 in properly spaced relation to define a radially inwardly opening working chamber 220 in which is received a circular body 221 of a supporting disk 222. Proper shear film spaced relation of the working surfaces of the inertia members 210 and 211 and the disk body 221 within the working chamber 220 is maintained by means of elastic tuning spring, spacing and sealing rings 223 mounted in annular grooves 224 facing axially toward the body 221 adjacent to the radially inward opening from the chamber 220. In this instance, the grooves 224 are defined between radially inner edges of the inertia member laminations 213 and means at the radially inner sides of the grooves assuring concentricity and protective enclosure of the rings 223, desirably comprising axially extending flanges 225 at the radially inner ends of the outer casing laminations 212 of the inertia members 210 and 211. Each of the elastic rings 223 is, in this instance, elongated axially, engages at its radially inner side against the associated flange 225 and at its radially outer side against a surface on the body 221 provided by an axially extending annular flange 227 projecting from the adjacent side of the body 221. Attachment of the flanges 227 to the body 221 may be by means of radially inwardly extending respective attachment flanges 228 which may be secured to the disk 222 as by means of spot welding 229. By preference, the elastic rings 223 engage at their axial ends respectively the inertia member outer casing laminations 212 and the contiguous portions of the attachment flanges 228. To enhance their tuning spring function, the elastic rings 223 are preferably bonded frictionally or otherwise to at least the flanges 225 and 227. Reservoir space for viscous damping medium may be provided between the flanges 227 and the radially inner edges of the laminations 213, such reservoir spaces communicating with the working chamber 220.

A tuned torsional viscous damper 230, as shown in FIG. 20, comprises a ring shaped inertia mass 231 which is adapted to be formed from heavy gauge sheet steel stampings, comprising an inertia member 232 and a complementary inertia member 233, wherein the inertia member 233 has an axially extending radially outer flange 234 provided with a rabbet shoulder 235 engaged by the radially outer edge of the inertia member 232 and locked in place by means of a turned terminal locking flange 237 on the inertia member flange 234, and which also locks sealing material in a groove 238. A working chamber 239 defined between the members 232 and 233 receives therein a circular body 240 of a supporting disk 241, with the confronting radial and axial working surfaces within the chamber 239 in shear film spaced relation having regard to viscosity of viscous damping medium loaded into the chamber. The body 240 may have one or more axially extending fluid transfer ports 241 therethrough to facilitate equalization of viscous damping medium on both sides of the body 240. Elastic tuning spring, spacing and sealing rings 242 are engaged in coaxial annular grooves 243 in the radially inner end portions of the inertia members 232 and 233 and facing axially toward the body 240 adjacent to the radially inward opening from the chamber 239. The elastic rings 242 engage the inertia mass members 232 and 233 in the grooves and also engage with surfaces on the body 240 and are desirably bonded thereto at least frictionally, although a bonding agent may be employed if desired. Means at the radially inner sides of the grooves 243 to assure concentricity and protective enclosure of the rings 242 comprise retaining flanges 244 on the radially inner edges of the inertia members 232 and 233 and turned toward but in close clearance relation to the body 240. At the radially outer sides of the grooves 243, shoulders 245 cooperate with the elastic rings 242 to provide annular reservoir spaces.

It will be understood that variations and modifications may be effected without departing from the spirit and scope of the novel concepts of this invention.

I claim as my invention:

1. A tuned torsional viscous damper, comprising:

supporting disk means having a radially outwardly extending circular body with a radially inner hub portion adapted to be secured to a rotary member such as a crankshaft subject to vibrations to be damped by the damper;

a ring shaped inertia mass having an inner diameter and a radially inward annular opening through said inner diameter and leading from an annular working chamber within which said body is received concentrically through said opening;

a viscous damping medium in said chamber;

said body and said inertia mass having within said chamber parallel confronting working surfaces in shear film spaced relation having regard to the viscosity of said damping medium;

said inertia mass having concentrically therein annular grooves respectively facing axially toward said body adjacent to said radially inward opening;

elastic tuning spring, spacing and sealing rings engaging said inertia mass in said grooves and engaging with surfaces on said body;

and generally axially extending retaining and sealing flange means at the radially inner sides of the grooves providing said inner diameter and providing generally radially outwardly facing concentricity defining and sealing shoulder wall surfaces concentrically and sealingly engaged by radially inner diameters of said elastic rings and thereby assuring concentricity and protective enclosure of said elastic rings within said grooves;

said elastic rings maintaining said shear film spaced relation of said working surfaces;

said sealing engagement of the radially inner diameters of said elastic rings with said radially outwardly facing concentricity defining and sealing shoulder wall surfaces substantially protecting the elastic rings against intrusion of dirt and contaminants by way of said radially inward opening;

said shoulder wall surfaces serving as alignment pilot means for the elastic rings and the engagement of the radially inner diameters of said elastic rings with said radially outwardly facing concentricity defining and sealing shoulder wall surfaces assuring concentricity of the elastic rings and the inertia mass for stabilized tuning spring function of the elastic rings.

2. A damper according to claim 1, wherein said elastic rings are bonded to said inertia mass and to said circular body.

3. A damper according to claim 2, wherein the elastic rings are free from said retaining flange means.

4. A damper according to claim 1, wherein said inertia mass comprises complementary annular inertia members, and means at the radially outer side of said working chamber maintaining the inertia members in spaced relation to define said working chamber between the members.

5. A damper according to claim 1, wherein said inertia mass comprises complementary annular inertia members, ring means about the outer perimeters of the inertia members securing the inertia members together, and radially inward annular projection from said ring means extending between said inertia members.

6. A damper according to claim 5, wherein said annular projection comprises a flange extending into said chamber, said supporting disk body having a groove serving as an extension of said working chamber and into which said flange projects, said flange and said body within said groove having confronting parallel working surfaces in shear film spaced relation having regard to the viscosity of said damping medium.

7. A damper according to claim 5, wherein said supporting disc comprises disk plates in laminar relation defining therebetween said groove in said circular body.

8. A damper according to claim 1, wherein said circular body has axially extending flange means, and said inertia mass has axially extending groove extension from said working chamber into which said flange means project, said flange means and said groove extensions having confronting surfaces in shear film spaced relation.

9. A damper according to claim 8, wherein said flange means comprise a ring member attached to said circular body.

10. A damper according to claim 9, wherein said ring member is attached to the radially outer perimeter of said circular body and extends from each opposite side of the body.

11. A damper according to claim 9, wherein said ring comprises a member secured to the circular body spaced from its radially outer perimeter.

12. A damper according to claim 8, wherein said flange means are on the radially outer perimeter of the circular body, and additional flange means on said body spaced radially inwardly from the first mentioned flange means, the inertia mass having additional groove extension from said chamber having working surfaces in shear film spaced relation to working surfaces of the additional flange means.

13. A damper according to claim 1, wherein said supporting disk means, including said circular body, comprise a plurality of disk members in laminar relation.

14. A damper according to claim 1, wherein said inertia mass comprises a pair of members connected together at their radially outer perimeters, at least one of said members comprising a stamped sheet metal part.

15. A damper according to claim 14, wherein both of said members comprise complementary stamped sheet metal parts.

16. A damper according to claim 15, wherein both of the inertia members comprise a plurality of stamped sheet metal parts.

17. A damper according to claim 1, wherein said elastic rings are about five times as wide in radial extent as thick in axial extent.

18. A damper according to claim 1, wherein said elastic rings are of generally U-shape, and said surfaces on said body comprise axially extending flanges projecting into the U-shapes of the elastic rings.

19. A damper according to claim 1, wherein said surfaces on said body with which the elastic rings engage comprise axially extending flange means.

20. A tuned torsional viscous damper, comprising:

supporting disk means having a radially extending circular body with a radially inner hub portion adapted to be secured to a rotary member such as a crankshaft subject to vibrations to be damped by the damper;

a ring shaped inertia mass having a radially inwardly opening annular working chamber within which said body is received;

a viscous damping medium in said chamber;

said body and said inertia mass having parallel confronting working surfaces in shear film spaced relation having regard to the viscosity of said damping medium;

said inertia mass having coaxial annular grooves facing axially toward said body adjacent to the radially inward chamber opening;

elastic tuning spring, spacing and sealing rings engaging said inertia mass in said grooves and engaging with surfaces on said body;

generally axially extending retaining flange means at the radially inner sides of the grooves assuring concentricity and protective enclosure of said elastic rings;

said inertia mass comprising complementary annular inertia members;

ring means about the outer perimeters of the inertia members securing the inertia members;

radially inward annular projection from said ring means extending between said inertia members;

said annular projection comprising a flange extending into said chamber;

said supporting disk body having a groove serving as an extension of said working chamber and into which said flange projects;

and said flange and said body within said groove having confronting parallel working surfaces in shear film spaced relation having regard to the viscosity of said damping medium.

21. A damper according to claim 20, wherein said supporting disk comprises disk plates in laminar relation defining therebetween said groove in said circular body.

22. A tuned torsional viscous damper, comprising:
supporting disk means having a radially extending circular body with a radially inner hub portion adapted to be secured to a rotary member such as a crankshaft subject to vibrations to be damped by the damper;
a ring shaped inertia mass having a radially inwardly opening annular working chamber within which said body is received;
a viscous damping medium in said chamber;
said body and said inertia mass having parallel confronting working surfaces in shear film spaced relation having regard to the viscosity of said damping medium;
said inertia mass having coaxial annular grooves facing axially toward said body adjacent to the radially inward chamber opening;
elastic tuning spring, spacing and sealing rings engaging said inertia mass in said grooves and engaging with surfaces on said body;
generally axially extending retaining flange means at the radially inner sides of the grooves assuring concentricity and protective enclosure of said elastic rings;
said circular body having axially extending flange means;
and said inertia mass having axially extending groove extension from said working chamber into which said flange means project;
said flange means and said groove extensions having confronting surfaces in shear film spaced relation.

23. A damper according to claim 22, wherein said flange means comprise a ring member attached to said circular body.

24. A damper according to claim 23, wherein said ring member is attached to the radially out perimeter of said circular body and extends from each opposite side of the body.

25. A damper according to claim 23, wherein said ring comprises a member secured to the circular body spaced from its radially outer perimeter.

26. A damper according to claim 22, wherein said flange means are on the radially outer perimeter of the circular body, and additional flange means on said body spaced radially inwardly from the first mentioned flange means, the inertia mass having additional groove extension from said chamber having working surfaces in shear film spaced relation to working surfaces of the additional flange means.

27. A tuned torsional viscous damper, comprising:
supporting disk means having a radially outwardly extending circular body with a radially inner hub portion adapted to be secured to a rotary member such as a crankshaft subject to vibrations to be damped by the damper;
a ring shaped inertia mass having an inner diameter and a radially inward annular opening through said inner diameter and leading from an annular working chamber within which said body is received concentrically through said opening;
a viscous damping medium in said chamber;
said body and said inertia mass having within said chamber parallel confronting working surfaces in shear film spaced relation having regard to the viscosity of said damping medium;
said inertia mass having concentrically therein annular grooves respectively facing axially toward said body adjacent to said radially inward opening;
elastic tuning spring, spacing and sealing rings engaging said inertia mass in said grooves and engaging with surfaces on said body;
generally axially extending elastic ring position piloting and retaining flange means at the radially inner sides of the grooves and intervening between said inner diameter and the grooves and providing generally radially outwardly facing concentrically defining shoulder wall surfaces concentrically engaged by radially inner diameters of said elastic rings and thereby assuring concentricity and protective enclosure of said elastic rings within said grooves;
said inertia mass comprising a pair of member connected together at their radially outer perimeters;
at least one of said members comprising a stamped sheet metal part having an annular radially outer portion providing a working surface in shear film spaced relation to the circular body;
said sheet metal part member having an annular radially inner portion which is axially outwardly offset relative to said radially outer portion and said offset radially inner portion defining the annular groove of said sheet metal part member;
and the radially inner extremity of said inner portion being bent axially inwardly and providing said piloting and retaining flange means at the radially inner side of the groove defined by said offset inner portion.

28. A damper according to claim 27, wherein both of said inertia mass members comprise complementary stamped sheet metal parts each of which has an annular radially inner axially outwardly offset portion defining said grooves and each having the radially inner extremity of the offset portion axially inturned toward the circular body and providing the concentricity piloting and retaining flange means.

* * * * *